United States Patent
Dietz et al.

(10) Patent No.: US 10,845,261 B2
(45) Date of Patent: Nov. 24, 2020

(54) DEVICE FOR MEASURING OF FORCES AND WEIGHING DEVICE

(71) Applicant: Wincor Nixdorf International GmbH, Paderborn (DE)

(72) Inventors: Oliver Dietz, Borchen (DE); Stefan Schmelter, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 16/413,561

(22) Filed: May 15, 2019

(65) Prior Publication Data
US 2019/0353544 A1 Nov. 21, 2019

(30) Foreign Application Priority Data
May 16, 2018 (EP) .................................... 18172618

(51) Int. Cl.
| G01L 5/164 | (2020.01) |
| G01D 11/24 | (2006.01) |
| G01G 3/15 | (2006.01) |
| G01G 23/36 | (2006.01) |

(52) U.S. Cl.
CPC ............ *G01L 5/164* (2013.01); *G01D 11/245* (2013.01); *G01G 3/15* (2013.01); *G01G 23/36* (2013.01)

(58) Field of Classification Search
CPC ........ G01L 5/164; G01D 11/245; G01G 3/15; G01G 23/36; G06F 3/016; G06F 3/03545; G01F 3/0414
USPC .................................................... 73/862.636
See application file for complete search history.

(56) References Cited

U.S. PATENT DOCUMENTS

| 4,558,757 A * | 12/1985 | Mori ..................... G06F 3/0414 177/199 |
| 5,541,372 A * | 7/1996 | Baller ................... G06F 3/0414 178/18.01 |
| 6,538,215 B2 * | 3/2003 | Montagnino ...... G01G 19/4146 128/921 |
| 8,387,437 B2 * | 3/2013 | Yamazaki .............. G01G 23/01 73/1.13 |
| 9,307,663 B2 * | 4/2016 | Hasegawa ................ H01H 9/04 |
| 10,451,501 B2 * | 10/2019 | Eilersen ............... G01G 21/245 |

(Continued)

FOREIGN PATENT DOCUMENTS

| EP | 3106845 A1 | 12/2016 |
| WO | 2017097304 A1 | 6/2017 |

OTHER PUBLICATIONS

Extended European Search report filed in the corresponding European application; 9 pages.

(Continued)

*Primary Examiner* — Octavia Hollington
(74) *Attorney, Agent, or Firm* — Black, McCuskey, Souers & Arbaugh LPA

(57) ABSTRACT

A device for measuring forces or a weighing device includes at least one sensor, at least one force input device configured to elastically deform in relation to an external force acting on the device, and a casing coupled to the sensor and the force input device. The sensor is configured such that, when the force is applied to the device, the sensor detects the force in relation to the elastic deformation of the force input device, and the casing is configured to accommodate the sensor in the casing in at least two different positions.

13 Claims, 7 Drawing Sheets

(56) References Cited

U.S. PATENT DOCUMENTS

| | | | |
|---|---|---|---|
| 2008/0261696 A1* | 10/2008 | Yamazaki | A63F 13/06 |
| | | | 463/39 |
| 2010/0012395 A1 | 1/2010 | Mannhart et al. | |
| 2010/0313678 A1 | 12/2010 | Park | |
| 2015/0227256 A1* | 8/2015 | Hsieh | G06F 3/0414 |
| | | | 345/174 |
| 2016/0363475 A1* | 12/2016 | Bedetti | G01G 7/00 |

OTHER PUBLICATIONS

Anonymous: "Battery Free RIFD Sensors—Force/Strain—Farsens Wireless Sensorproducts/battery-free-rfid-sensors/force-s" Mar. 15, 2015, XP055521366, Retrieved from the Internet: URL: http://www.farsens.com/en/products/battery-free-rfid-sensors/force-strain/ [retrieved on Nov. 6, 2018] the whole document.

Communication pursuant to Article 94(3) EPC dated Aug. 4, 2020 in EP patent application 18172618.3.

* cited by examiner

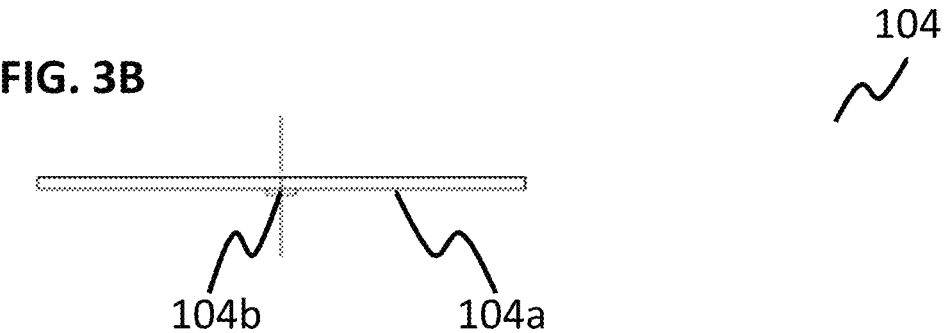
FIG. 3B
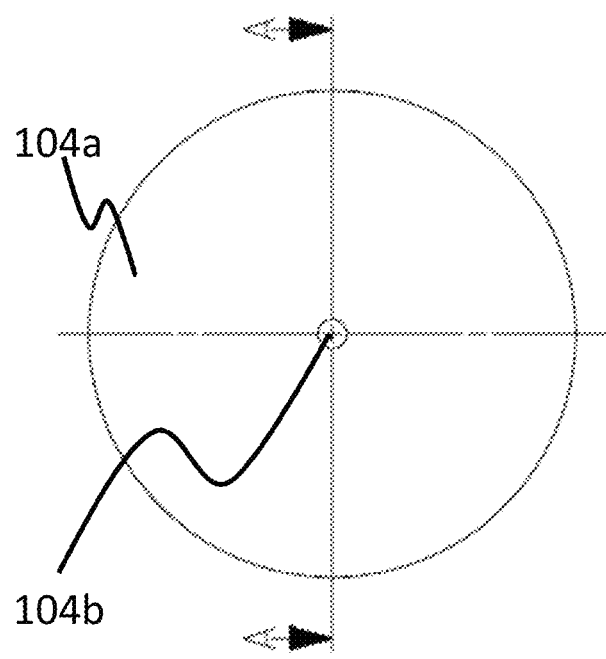
FIG. 3A
FIG. 3C
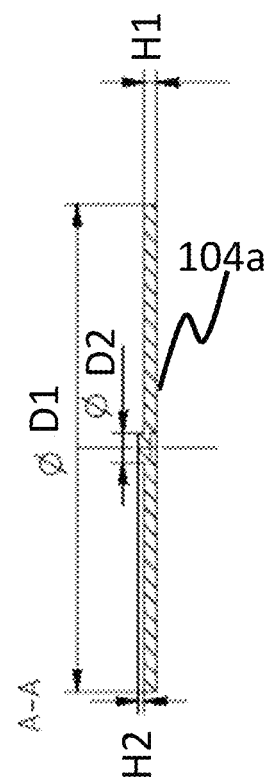

FIG. 5B FIG. 5A
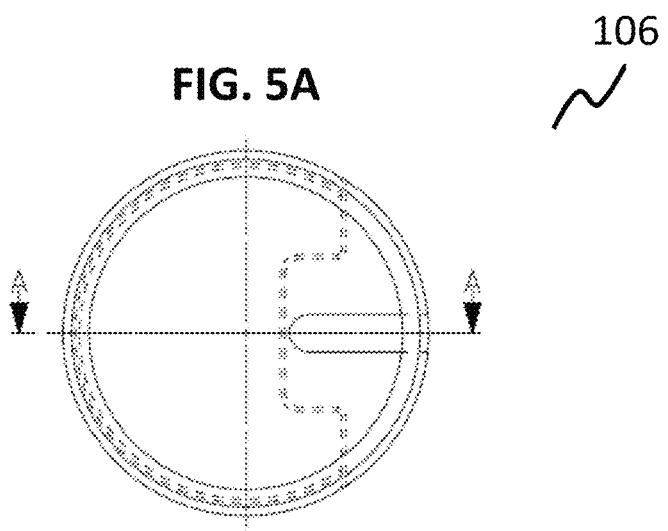
FIG. 5C
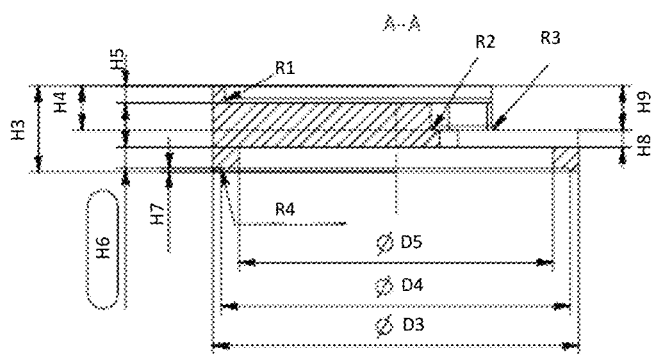
FIG. 5D
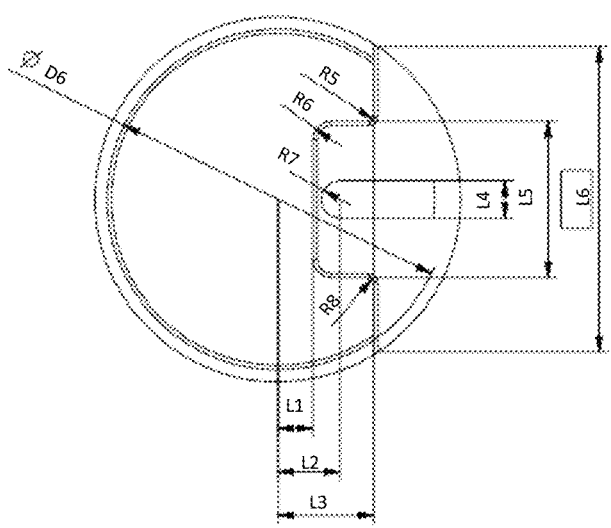

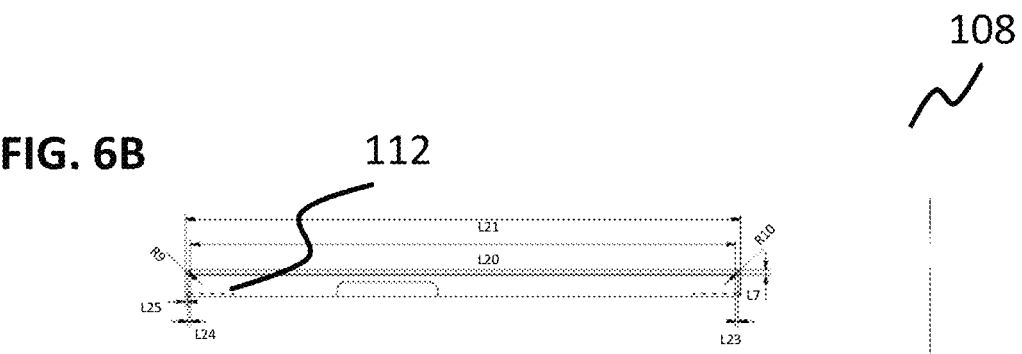
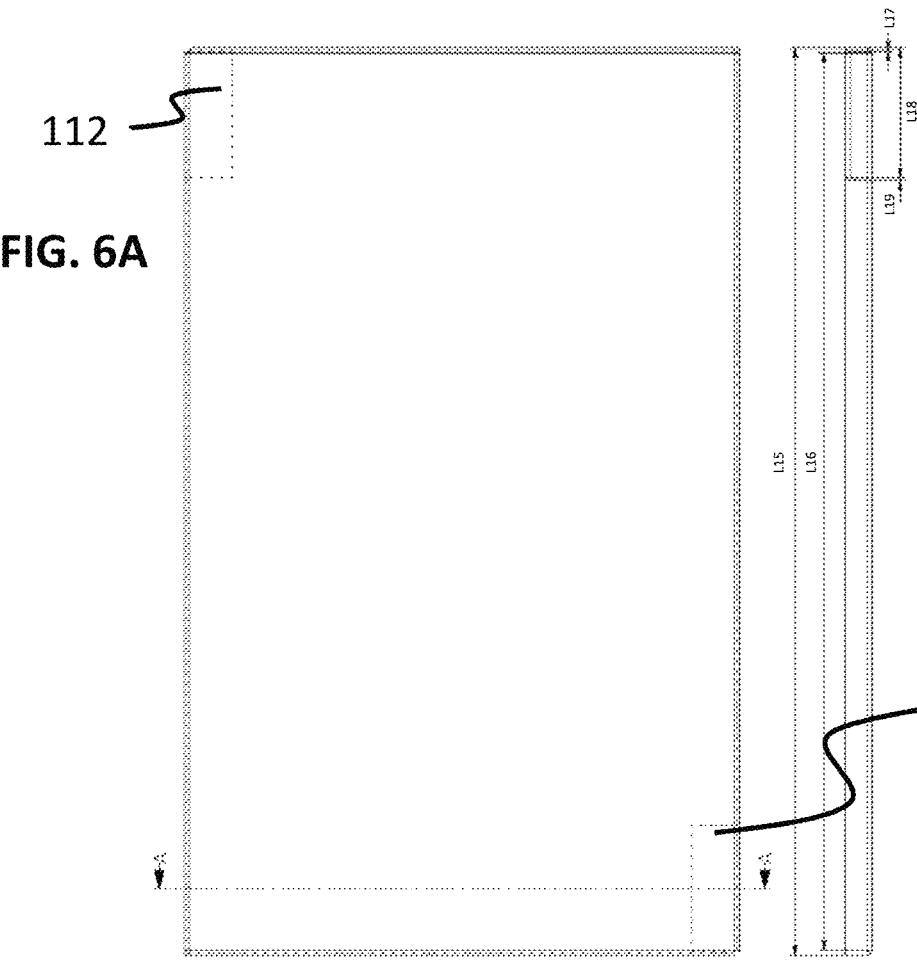
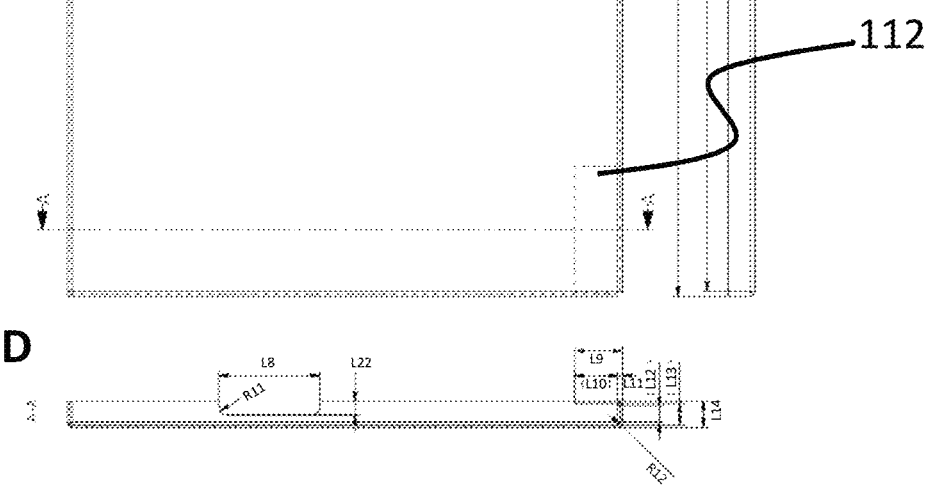
FIG. 6A
FIG. 6B
FIG. 6C
FIG. 6D

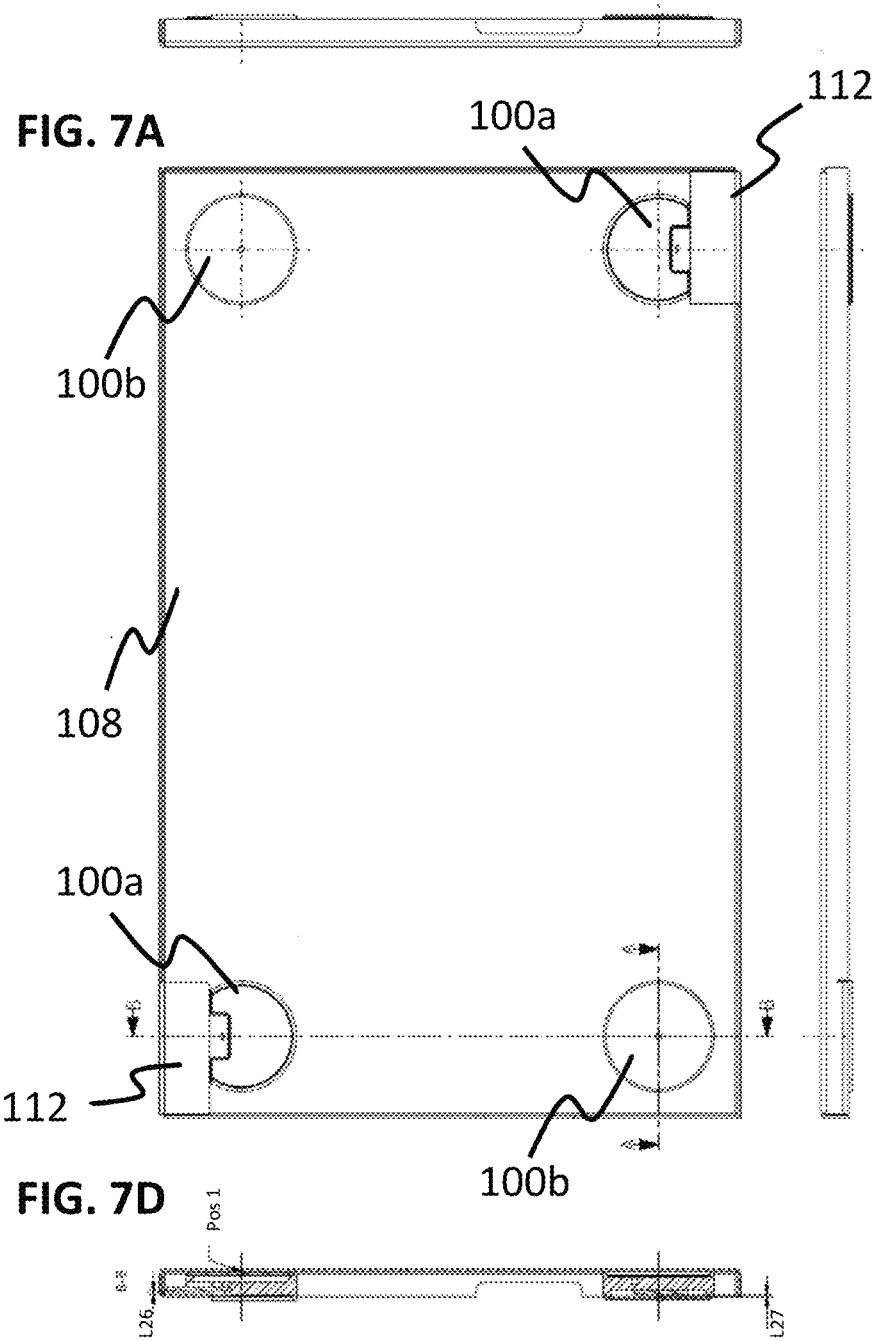

DEVICE FOR MEASURING OF FORCES AND WEIGHING DEVICE

CROSS-REFERENCE TO RELATED APPLICATIONS

This application claims priority to and the benefit of European Patent Application EP 18 172 618.3 filed 16 May 2018, the contents of which are hereby incorporated by reference in their entirety.

BACKGROUND AND SUMMARY

Various embodiments relate generally to a device for measuring of forces and a weighing device.

Conventional devices for measuring forces do only have a high measuring accuracy in a small portion of a total measuring range. By way of example, a high measuring accuracy may exist in case the device is charged by a small weight or a high measuring accuracy may exist only when the device is charged by a heavy weight.

In various embodiments, a device is provided that allows a precise determining of a weight change over a large measuring range. In various embodiments, a device is provided that acquires information concerning an increase of a load or force or a decrease of a load or force, e.g. in a shopping trolley or on a shelf. Further, a device is provided which may be highly compatible with different spatial situations, e.g. in that the device may be easily accommodated in various devices for measuring forces like scales, shopping trolleys or shelves.

In various embodiments, a device for measuring forces may include: at least one sensor, at least one force input device configured to elastically deform in relation to an external force acting on the device, and a casing coupled to the sensor and the force input device, wherein the sensor is configured such that, when the force is applied to the device, the sensor detects the force in relation to the elastic deformation of the force input device, and wherein the casing is configured to accommodate the sensor in the casing in at least two different positions.

In various embodiments, the force input device may be realized as a thin circular plate, which may be deformed elastically, e.g. may be bent due to a force or load which may be applied to the force input device.

In various embodiments, the casing and the force input device may be realized in a single device.

In various embodiments, the sensor may be an inductive sensor, and/or wherein the force input device may be made from an electric conductive material. In various embodiments, the sensor may be an inductive proximity sensor. In various embodiments, the sensor may measure, e.g., a voltage due to a movement of a conductive material next to the sensor or at least one coil of the sensor. Thus, a robust device for measuring forces may be achieved.

The sensor may be a capacitive sensor.

The sensor may include at least one of a coil, a magnetic core, an oscillator, a demodulator, a flip-flop, a comparator, an output stage, and a printed circuit board. The sensor may include at least an induction loop or coil. Using electric current, a magnetic field may be generated in the induction loop, which may collapse due to a conductive material next to the induction loop. The inductance of the loop may change according to the material inside it, and since metals are more effective inductors than other materials, a presence of metal may increase the current flowing through the loop. In various embodiments, this change may be detected by a sensing circuitry. Inductive sensors may work without contact, and they detect metal objects that move into their measuring field. An oscillator may generate an electromagnetic alternating field by means of an oscillating circuit. The electromagnetic alternating field may emerge from the active surface of the sensor. In each approaching metal object, vortex currents may be induced, which reduce energy from the oscillator. This may result in a change in level at the oscillator output, which may be configured to switch the output stage for, e.g., a digital sensor via a trigger, e.g., a Schmitt-trigger, or may influence an analog output signal for measuring a force or load as a function of the object distance. In other words, an inductive sensor may be used for non-contact detection of metallic objects. The operating principle is based on a coil and an oscillator that creates an electromagnetic field in the surroundings or close surroundings of the sensing surface. The presence of a metallic object, e.g. a force input device or actuator, in the operating area may cause a dampening of the oscillation amplitude. The rise or fall of such oscillation may be identified by a threshold circuit, which may change the output of the respective sensor, which may be analog or digital. The operating distance of the sensor may depend on the force input device's shape and may depend on the used material of the force input device. The force input device may be a spring, which allows elastic deformation.

In various embodiments, a system for measuring forces may include a metal target, at least a sense coil, at least a capacitor, a gain control, a demodulator, and an amplifier. The metal target may be a force input device and/or a portion of the support panel, e.g. a U-turned portion of the support panel. An inductor-capacitor (LC) tank circuit may be pumped by an oscillator. The inductor may be made from a sensing coil (coil L and resistor RS). When a conductive metal object, e.g. a metallic plate or metallic support panel, is brought near the sensing coil, eddy currents may be formed in the object as a function of the distance between the sensing coil and the object, the material of the object, and the size of the object. A distance between the sensing coil and the metal target, which may be a distance between the sensor and a portion of the support panel or a distance between the sensor and the force input device, may be changed by applying a force on the device for measuring forces. The eddy currents may form an opposing magnetic field that may have an effect of reducing the oscillation amplitude. The apparent effect may be that the parallel resonance impedance RP=L/RSC of the tank circuit may be changed, wherein L may be the coil inductance in henrys, RS may be the coil series resistance in ohms, and C may be the parallel capacitance in farads. The change in the apparent parallel resistance may be measured, e.g. to determine distances to a target, e.g. to a force input device and/or an U-turned portion of a support panel. A demodulator may be placed following the tank to digitalize the resultant direct current value using an analog-digital converter. As RP may change, the amplitude of the tank may diminish. The demodulator may be followed with a closed-loop control system to maintain the LC tank's oscillation amplitude. When a metal object may move closer to the sense coil, the opposing magnetic field may require more drive current into the tank, which may be accurately measured, and which is dependent on an acting force on the device for measuring forces. A wide dynamic range in measuring RP is provided and an overall performance may be improved.

The sensor may be enclosed by the casing or the sensor may be partially enclosed by the casing. When the sensor may be enclosed by the casing, the sensor may be fully integrated in the casing. In various embodiments, no component of the sensor may protrude from an outer surface of the casing, e.g. when viewed from a top view and/or side view. When the sensor may be partially enclosed by the casing, at least a portion of the sensor may protrude from the casing, e.g. when viewed from a top view and/or side view. A coil for generating an electromagnetic field and which is part of the sensor may protrude from a side surface of the casing to interact, e.g., with a U-turned portion of a support panel.

Furthermore, the sensor may further include an integrated Radio Frequency Identification (RFID) communication device, configured such, that depending on the acting force, the sensor communicates data to an external device using the integrated RFID communication device. The RFID communication device may be a tag, which may have an embedded transmitter and receiver. However, any other form of RFID communication device having the same or equal electronic characterization may be used instead. The actual RFID component contained in a tag may include at least two parts: an integrated circuit for storing and processing information, and an antenna for receiving and transmitting at least one signal. The RFID tag may include a non-volatile memory, and may include either fixed or programmable logic for processing transmission and sensor data. The RFID communication device may be passive, active, or battery-operated.

The RFID communication device may use radio energy transmitted, e.g. by the reader. An active RFID communication device may feature an onboard battery, which may periodically transmit its credentials. An RFID communication device may be part of each sensor in a device for measuring forces. Each sensor may be configured to transmit detected force data to a central electronic device and/or to a reader.

The sensor may include an integrated Wireless Local Area Network communication device (WLAN communication device) and/or an integrated Bluetooth communication device for communicating data with an external device or for communicating data with at least a further sensor of a plurality of devices for measuring forces. However, it will be appreciated that any suitable communication may be used instead.

The force input device may include a circular disk shape. The force input device may be made of an elastic material, and at least one protrusion may be provided at a center position of the force input device. The protrusion may be orientated away from the casing. The at least one protrusion may be part of the force input device or may be glued to the force input device. When the at least one protrusion may be part of the force input device, the force input device may be manufactured using e.g. a milling process and/or grinding process. The force input device may be in contact with or be coupled to a support panel using the protrusion. The support panel may include or essentially consist of an elastic material. The force input device may be in contact with a ground on which the device or the weighing device is positioned. The force input device may include a first and a second portion. The first portion may be manufactured in one piece. In various embodiments, the force input device may, for example, have a diameter in a range of about 35 mm to 45 mm, e.g. of about 40 mm. The second portion may be implemented as cam or protrusion and may, for example, have a diameter in a range of about 2 mm to 3 mm, e.g. of about 2.4 mm. The first portion may have a height in a range of about 0.5 mm to 1.5 mm, e.g. of about 1 mm. The second portion may have a height in a range of about 0.3 mm to 0.8 mm, e.g. of about 0.5 mm.

The first portion and the second portion may be separate entities. The first portion and the second portion may be connected using glue, for example, Cyanoacrylate, for example, Loctite 401 or Loctite 406. However, any other type of connection having the same or equal mechanical characterization may be used instead. The first portion may have a height or thickness in a range of about 0.6 mm to 1.0 mm, e.g. of about 0.8 mm. The first portion may have a height or thickness in a range of about 0.3 mm to 0.8 mm, e.g. of about 0.5 mm. In case that the first portion has a height or thickness in a range of about 0.6 mm to 1.0 mm, e.g. of about 0.8 mm, or in case that the first portion has a height or thickness in a range of about 0.3 mm to 0.8 mm, e.g. of about 0.5 mm, the second portion or cam may have a diameter in a range of about 2.2 to 2.6 mm, e.g. of 2.4 mm, and may have a height in a range of about 0.8 mm to 1.2 mm, e.g. of 1 mm.

The material used for the first and second portions may be steel, for example, soft metal or soft steel, suitable for cold forming, for example, B1 EN 10131-1.00-DC01=1.0330 EN 10130. However, any other material having the same or equal mechanical characterization may be used instead.

The force input device and/or the sensor may be coupled to the casing using glue. The force input device and/or the sensor may be coupled to the casing using at least a screw, a rivet, or other known joining techniques. The sensor 102 and/or the force input device 104 may be clamped to the casing. However, any other material having the same or equal mechanical characterization may be used instead.

The force input device and the casing may be arranged concentrically. In other words, the force input device and the casing may be arranged in a way in which the force input device is positioned on a surface of the casing. A central point of the force input device and a center of a recess or a cavity are positioned on one line.

The casing may include a circular cylindrical shape of a predetermined height. A first side of the casing may include a recess of a predetermined depth. A second side of the casing may include a first recess of a predetermined depth and a second recess of a predetermined depth. The casing may include a step of a predetermined height and a recess of a predetermined length. The casing may further include an elongated hole of a predetermined depth. The casing may be manufactured using injection molding, e.g. plastic injection molding.

The casing may be made of Polyamide 12, and/or the force input device may be made of steel. However, any other material having the same or equal mechanical characterization may be used instead.

The force input device may be made of stainless steel and/or spring steel. A device for measuring forces may be operated by at least a battery or may be operated by a power supply. A device for measuring forces may output analog and/or digital values. The device for measuring forces may convert analogous measured values to digital output values, e.g., by use of at least one analog-digital converter. The device for measuring forces may at least include a processor and/or a memory. The device for measuring forces may at least communicate with an external device or a processing unit using grind-bound connection and/or wireless communication, e.g., Wireless Local Area Network (WLAN) or Bluetooth. However, it will be appreciated that any suitable communication may be used instead.

A weighing device for weighing of objects may include a plurality of devices, and at least one support panel. Each device may be arranged at an edge corner portion of a first surface of the support panel, respectively; and the devices may be coupled to the first surface of the support panel such, that at least one device may be coupled to the support panel using a first side of the device, and at least one further device may be coupled to the support panel using a second side of the further device. The second side may be an opposite side of the first side. In other words, each of the devices for measuring forces may be positioned next to intersection points of side edges of the support panel. A first side of the device may be a top surface of the device and a second side of the device may be a bottom surface of the device and vice versa.

Adjacent devices of the plurality of devices arranged on the support panel may be coupled to the support panel using alternating the first side of the device and the second side of the device. In other words, adjacent devices for measuring forces may be positioned such that their orientation is turned by 180 degrees in relation to a surface of the support panel. In other words, the orientation of adjacent devices for measuring forces may be such that in relation to an axis which intersects the longitudinal axis of a device for measuring forces and which is orthogonal to the longitudinal axis of a device for measuring forces adjacent devices are turned in an angle of about 180 degrees in relation to the axis.

The support panel may include a plate shape of a predetermined height and may be made of an electric conductive material. At least one edge portion of the support panel may include an U-turned portion, the U-turned portion may be configured to partially overlap at least one device of the plurality of devices, the U-turned portion of the support panel and the at least one sensor may be configured such that, when a force may be applied to the force input device using the support plate, the at least one sensor may measure a change in an electromagnetic field generated by the sensor due to movement of the respective U-turned portion, and the sensor may be partially enclosed by the casing. The U-turned portion may be position such that the U-turned position is next to step in the casing.

A portion of the support panel may be L-shaped wherein an angle may be in a range of about 80 to 100 degrees, e.g. about 90 degrees. The casing may merely partially enclose the sensor, so that at least a portion of the sensor, e.g. at least a coil or sensing coil, may protrude from the casing and is oriented towards the U-turned portion to interact with the U-turned portion of the support panel. The U-turned portion may include the same material, e.g. conductive material, such as metal, as the support panel. The U-turned portion may include a material, e.g. conductive material, such as metal, but the support panel may include a material, which may differ from the material of the U-turned portion. The U-turned portion may be a separate component and may be coupled to the support panel, e.g., by glue, at least one screw connection, at least one rivet joint connection or other known types of connection. However, any other connection type having the same or equal mechanical characterization may be used instead.

The sensor may be positioned in the casing such that at least one coil of the sensor is arranged next to the force input device, so that the sensor may detect a movement of the force input device due to an influence of an acting force. The sensor may include at least one circular arranged coil, wherein the coil may be concentric to circular force input device. The sensor and a portion of the U-turned portion of the support panel may have a distance of about 0.5 to 1.5 mm, e.g. of about 1 mm. At least two U-turned portions may be provided at the support panel, and, the U-turned portion may be arranged such, that the U-turned portions may be arranged diagonally to the support panel which may be of a rectangular or a quadratic shape. At least an edge portion of the support panel may be bent in an angle in a range of about 80 to 100 degrees, e.g. of about 90 degrees. Edge portions of the support panel may be bent in an angle in a range of about 80 to 100 degrees, e.g. of about 90 degrees to protect the at least one device for measuring forces including a sensor from contamination. At least two U-turned portions may be provided at the support panel, which may be diagonally positioned at edge portions in relation to a rectangular support panel, wherein at the remaining edges no U-turned portions may be provided.

A portion of the support panel may be configured to accommodate an electronic device, wherein the electronic device may be configured to communicate with at least one sensor of the at least one device, and may further be configured to communicate data to an external device using RFID transmission. The electronic device may include a printed circuit board. The electronic device may be positioned at a central portion of the support panel. The electronic device may be positioned on a side of the support panel which is an opposite side to the weighing side on which objects to be weighed are put. The electronic device may receive measured values from at least a device for measuring forces and process or transmit analog and/or digital values. The electronic device may convert analogous output values of at least one device for measuring forces to digital values, e.g., by use of at least one analog-digital converter. The electronic device may be operated using at least a battery or a power supply. The electronic device may be configured to communicate with at least one sensor of the at least one device, and the electronic device may further be configured to communicate data to an external device using, e.g., a Wireless Local Area Network communication (WLAN-communication) or Bluetooth communication. However, it will be appreciated that any suitable communication may be used instead.

At least one device may be coupled to the support panel using glue. The glue may be Cyanoacrylate (CA), e.g., Loctite 401 or Loctite 406. The at least one device may be coupled to the support panel using at least a screw, a rivet, or other joining techniques known by the skilled person.

The material used for the first and second portions of the force input device may be steel, for example, soft metal or soft steel, suitable for cold forming, for example, B1 EN 10131-1.00-DC01=1.0330 EN 10130, and the material of the casing may be Polyamide (PA) 12, the material of the support panel may be steel, for example, soft metal or soft steel, suitable for cold forming, for example, B1 EN 10131-1.00-DC01=1.0330 EN 10130, and, wherein the sensor includes at least a coil and a printed circuit board, and, wherein the chasing, the sensor, and the force input device are coupled using glue, for example, Cyanoacrylate, for example, Loctite 401 or Loctite 406. The weighing device may be operated by at least one battery or may be operated by a power supply.

A weighing device may include a support panel and four devices for measuring forces, wherein in each edge portion of the rectangular support panel at least one device for measuring forces may be positioned. Adjacent devices for measuring forces may be arranged in opposite directions such, that a first side of a casing of a first device may be oriented in a first direction and such, that a first side of a casing of a second device, which may be adjacent to the first device, may be arranged in a second and opposite direction. The devices and the support panel may be connected using glue. A sensor and a force input device may be coupled to a respective casing by glue. Two devices for measuring forces may be configured such, that respective sensors may be contained in the casing such, that no portion of the sensor may protrude out of a furthest edge portion of the casing when viewed from a top view and/or a side view, wherein the respective devices for measuring of forces are arranged diagonally in relation to the support panel. Two devices for measuring forces may be configured such, that portions of the respective sensors may protrude out of a furthest edge of the casing when viewed from a top view and/or a side view, wherein the respective devices for measuring of forces are arranged diagonally in relation to the support panel. At positions where the sensors may protrude the respective casing portions of the support panel, the support panel may have a U-turned shape. At positions where the sensors may protrude the respective casing portions of the support panel, a first side of the casing of the device for measuring forces may stand on a ground, and the opposite side of the casing may be coupled to the support panel via a force input device. Between a surface of the U-turned portion facing the sensor, and the sensor, e.g. at least a sensing coil, an air section is provided. When a force is applied on the support panel, the distance, e.g. an air section, between a surface of the U-turned portion of the support panel and a sensor, e.g. a sensing coil, is increased. When a force is removed from the support panel, the distance, e.g. an air section or gap, between a surface of the U-turned portion of the support panel and a sensor, e.g. a sensing coil, is decreased. At positions where the sensors may not protrude the respective casing portions of the support panel, a first side of the casing of the device for measuring forces is coupled with the support panel. At positions where the sensors may not protrude the respective casing portions of the support panel, a second side of the casing of the device for measuring forces may be coupled via a force input device to a ground. At positions where the sensors may not protrude the respective casing portions of the support panel, the sensor, e.g. a sensing coil, may be positioned in the casing of the device for measuring forces and may be arranged concentrically to the circular force input device. When a force is applied on the support panel, the force input device may be bent, and an air section between the sensor, e.g. a sensing coil, and the input force device may decrease. In other words, the force input device may be bent such that a central portion, e.g. at a middle point position, of the force input device is bent most. When a force is removed from the support panel, the distance, e.g., an air section or gap, between the force input device and the sensor, e.g., a sensing coil, may increase. Each sensor may output a measuring value, e.g. an analog voltage or digital value, indicating the force or load recorded at each position of a device. In the case the force input device approaches the sensor, the sensor output may output an increasing analog voltage value or may output a decreasing analog voltage value or a digital value. In case the U-turned portion of the support panel departs from the sensor, the sensor output may output an increasing analog voltage value or may output a decreasing analog voltage value or a digital value. An average of the measured values generated by a plurality of devices for measuring forces may be calculated using, e.g. a processor. A position of objects on the support panel may be calculated by capturing approximately simultaneously each output value of each sensor and performing mathematical evaluation of the captured output values measured by the plurality of devices for measuring forces. An intersection point of output parables of sensor output values of at least two adjacent devices of a plurality of devices may define a minimal resolution of the sensor system including a plurality of devices for measuring forces. At least a force impinging on the support panel may be calculated by mathematically adding the respective single output values of the plurality of sensors.

It may be achieved by the device for measuring forces and a weighing device to change a currently available Point Of Sale (POS) in a way that a manual capturing of goods may be omitted. A high level of automation may be achieved. The capturing of inventory, e.g. food and/or their weight may be implemented by determining or measuring a change in weight, for example in a shopping trolley or on shelves. An inventory, for example, in a supermarket, may be available at all times. Further, the content of a shopping trolley may be available at all times. The device is standardized and versatile as it may be used for measuring of forces, for example, in shopping trolleys, in scales, and in shelves. A casing of the device is configured such, that it may accommodate the sensor in at least two different ways. The device for measuring of a force may be used modular in a plurality of weighing units, independent from the type of weighing unit. The device for measuring forces may have a simple construction with a minimum number of components. There is no need of prefabricated food, e.g. prefabricated vegetables and fruits, which means, that food may be weighed by the device without packaging. Thus, the user or customer, e.g. a client in a supermarket, must not have any concern that a weight of an object also incorporates the weight of the packaging of a prefabricated food. Therefore, the user will benefit from using of the device for measuring forces. Using a plurality of devices for measuring forces a total measuring range may be divided in at least two partial measuring ranges, wherein each partial measuring range is coved by at least one device for measuring forces of the plurality of devices for measuring forces with high accuracy. Due to a specific arrangement of a plurality of devices for measuring forces, it is possible to achieve that each device for measuring forces may be operated in an optimal device sensing range, and a high accuracy of measurement of forces may be achieved. The customer of the sensor in at least different positions in the casing allows an optimization of a sensor measurement range of the sensor. Thus, an optimization of the sensor accuracy may be achieved. By measuring the change of weight in a shopping trolley, it may be identifiable, which inventory or products a customer has or a plurality of customers have added in the basket of their shopping trolley. Due to the optimized mechanical characteristics of the device for measuring forces, the device may be installed in shelves, scales and weighing units for fresh products. Only one standardized device for measuring forces or casing may be used to accommodate sensor at different positions in the casing, and thereby increasing modularity.

BRIEF DESCRIPTION OF THE DRAWINGS

In the drawings, like reference characters generally refer to the same parts throughout the different views. The drawings are not necessarily to scale, emphasis instead generally being placed upon illustrating principles. In the following description, various examples are described with reference to the following drawings.

FIGS. 3A to 3C are schematic views showing a force input device in accordance with various embodiments.

FIGS. 5A to 5D are schematic views showing a casing in accordance with various embodiments.

FIGS. 6A to 6D are schematic views showing a support panel in accordance with various embodiments.

FIGS. 7A to 7E are schematic views showing a weighing device for weighing of objects in accordance with various embodiments.

DETAILED DESCRIPTION

Figure 1A:
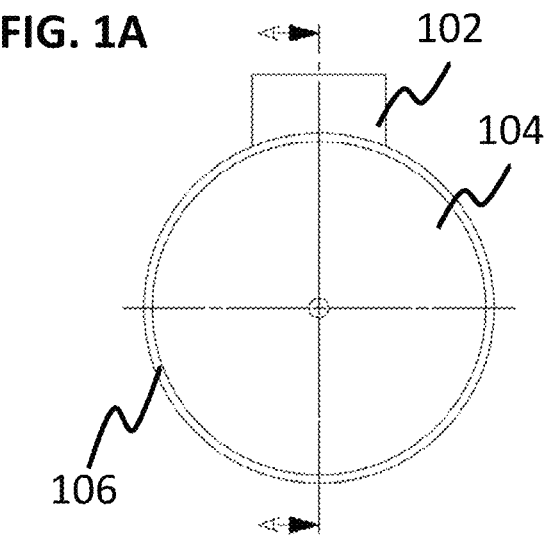
FIGS. 1A to 1D are schematic views showing a first example of a device for measuring forces in accordance with various embodiments.

The following detailed description refers to the accompanying drawings that show, by way of illustration, specific details and examples which may be practiced. These examples are described in sufficient detail to enable those skilled in the art. Other examples may be utilized, and structural, logical, and electrical changes may be made without departing from sprit or scope. The various examples are not necessarily mutually exclusive, as some examples may be combined with one or more other examples to form new examples. Various examples are described in connection with methods and various examples are described in connection with devices. However, it may be understood that examples described in connection with methods may similarly apply to the devices, and vice versa.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of" with regard to a group of elements (e.g. at least one of A and B, or in the same way, at least one of A or B) may be used herein to mean at least one element from the group consisting of the elements, i.e. the logical and/or. For example, the phrase "at least one of" with regard to a group of elements may be used herein to mean a selection of: one of the listed elements, a plurality of one of the listed elements, a plurality of individual listed elements, or a plurality of a multiple of listed elements.

The term "coupled" is used herein to mean for example communicatively coupled, which may include any type of a direct connection or an indirect connection. This may include any suitable wired connection and/or wireless connection or may include direct or indirect mechanical connection.

A "circuit" or "sensor" as used herein is understood as any kind of logic-implementing entity, which may include special-purpose hardware or a processor executing software. A circuit or sensor may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

A "processor" (or equivalently "processing circuitry" or "processing circuit") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor).

A "sensor" as used herein is understood as referring to any kind of device, module, or subsystem whose purpose may be to detect events or changes in its environment, e.g. a weight increase or a weight decrease, and send data or information to other electronic devices, which may be a processor or computer. Further, the sensor may include as processor.

A "force input device" as used herein is understood as referring to any kind of object, which allows deformation when an influence, for example, a force or load from external is applied to the force input device.

A "casing" as used herein is understood as referring to any kind of object, which allows carrying or accommodating other components, e.g. a sensor. Moreover, a casing as used herein is understood as referring to an object which is arranged or positioned between other objects, e.g. between a plate on which objects may be put, and a ground.

A "support panel" as used herein is understood as referring to any kind of surface, on which objects such as inventory may be deposited, for example, food and non-food products.

A "U-turned portion" as used herein is understood as referring to any kind of portion, which includes a U-shape when viewed from a side or a sectional view.

A "L-turned portion" as used herein is understood as referring to any kind of portion, which includes a L-shape when viewed from a side or a sectional view.

FIGS. 1A to 1D show a first example of a device for measuring forces in schematic views.

Figure 1B:
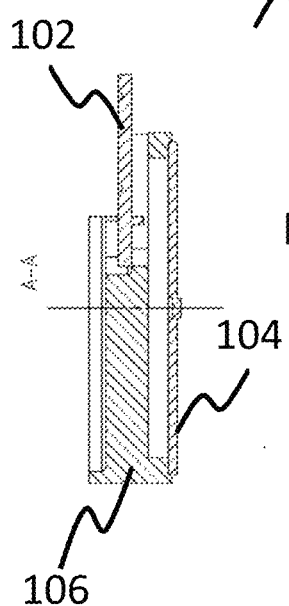
Figure 1C:
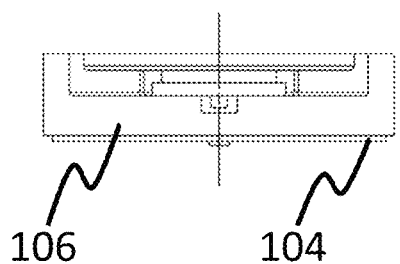
Figure 1D:
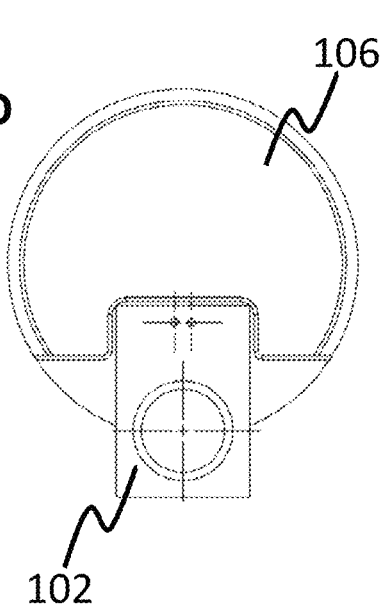

FIG. 1A shows a bottom view of the device for measuring forces in a schematic view in accordance with various embodiments. FIG. 1B shows a sectional view of the device for measuring of forces in a schematic view in accordance with various embodiments. FIG. 1C shows a side view of the device for measuring of forces in a schematic view in accordance with various embodiments. FIG. 1D shows a top view of the device for measuring forces in a schematic view in accordance with various embodiments.

The device 100*a* may include a sensor 102, a force input device 104, and a casing 106. The sensor 102 may be enclosed only partially by the casing 106, as illustrated in FIGS. 1A to 1D. In other words, at least a portion of the sensor 102 incorporating, e.g. at least one coil, may protrude from the casing 106. A sensor 102 and a force input device 104 may be coupled to the casing 106 using, e.g., glue, for example, Cyanoacrylate (CA), for example, Loctite 401 or Loctite 406. As schematically illustrated in FIG. 1B the sensor 102 is arranged parallel to the force input device 104 and parallel to a top and bottom surface of the casing. The sensor 102 may include a plate shape. The force input device 104 is firmly attached to the casing 106 and is configured to absorb a force. The sensor 102 and/or the force input device 104 may be clamped to the casing. The device 100a schematically illustrated in FIGS. 1A to 1D may be aligned in operation such that a portion of the device 100a having the force input device 104 is aligned upwards, while an opposite portion of the casing 106 is aligned downwards, and wherein the force input device 104 is aligned parallel to the horizontal.

In the following, various modifications and/or additional features may be described for the device 100a described above with reference to FIGS. 1A to 1D.

FIGS. 2A to 2D show a second example of a device 100b for measuring forces in schematic views in accordance with various embodiments.

Figure 2A:
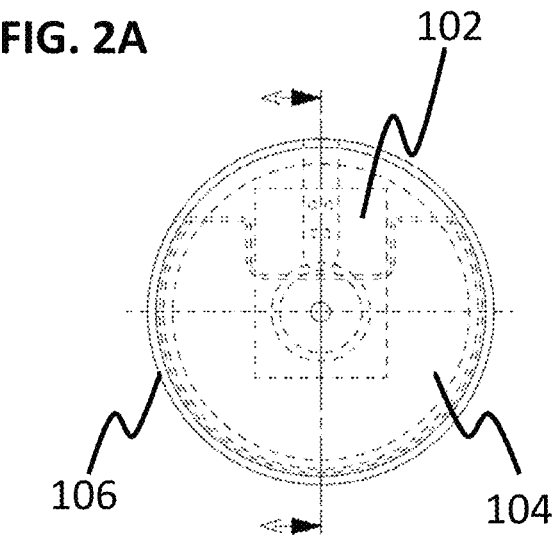
FIGS. 2A to 2D are schematic views showing a second example of a device for measuring forces in accordance with various embodiments.
Figure 2B:
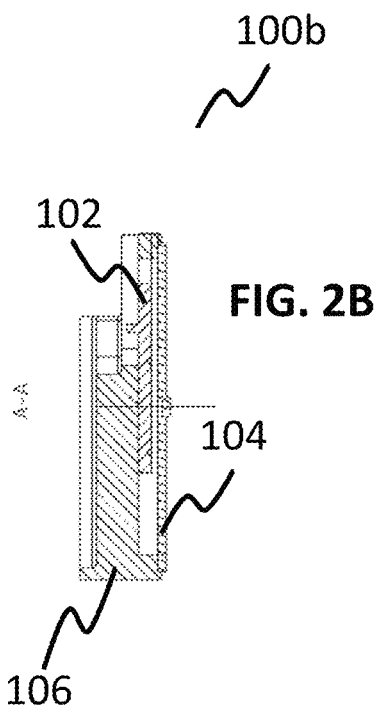
Figure 2C:
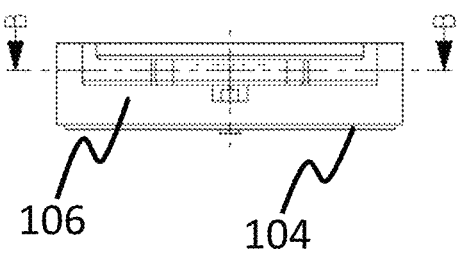
Figure 2D:
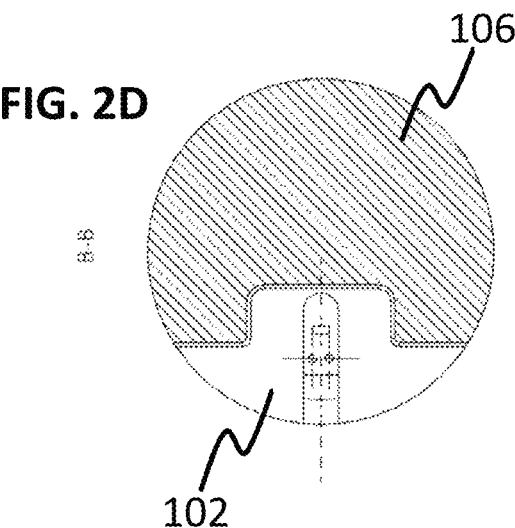

FIG. 2A shows a bottom view of the device 100b for measuring forces in a schematic view in accordance with various embodiments. FIG. 2B shows a sectional view of the device 100b for measuring forces in a schematic view in accordance with various embodiments. FIG. 2C shows a side view of the device 100b for measuring forces in a schematic view in accordance with various embodiments. FIG. 2D shows a top view of the device 100b for measuring forces in a schematic view in accordance with various embodiments.

The device 100b may include a sensor 102, a force input device 104, and a casing 106. The sensor 102 may be fully integrated or enclosed by the casing 106, as illustrated in FIGS. 2A to 2D. In other words, the sensor 102 may be provided not to protrude from the casing when viewed from a top view as illustrated in e.g. FIG. 2D or a side view as illustrated e.g. FIG. 2B. As schematically illustrated in FIG. 2A, the sensor 102 is integrated in the casing 106. The sensor 102 may at least include a coil, wherein the coil may be concentrically aligned with the circular cylindrical shaped casing. The sensor 102 and the force input device 104 may be aligned parallel to outer surfaces of the casing 106, as schematically illustrated in FIG. 2B. The device 100b may be aligned in operation such that a portion of the device 100b having the force input device 104 is aligned downwards, while an opposite portion of the casing 106 is aligned upwards, and wherein the force input device 104 is aligned parallel to the horizontal.

In the following, various modifications and/or additional features may be described for the device 100b described above with reference to FIGS. 2A to 2D.

FIGS. 3A to 3C show a force input device 104 in schematic views in accordance with various embodiments.

The force input device 104 may be used as force input device 104 in the devices 100a and 100b described in view of FIGS. 1A-1D and 2A-2D. The force input device 104 may include a first portion 104a and a second portion 104b. The first portion 104a may have a disc-shape or flat cylindrical shape. The second portion 104b may have a disc-shape or a flat cylindrical shape. The first portion 104a and the second portion 104b may be concentrically aligned, wherein a first surface of the first portion 104a may be in contact with or coupled to a first surface of the second portion 104b. The first portion 104a and the second portion 104b may be manufactured in one piece, as schematically illustrated in FIG. 3C. The force input device 104a may, for example, have a diameter D1 in a range of about 35 mm to 45 mm, e.g. of about 40 mm. The second portion 104b may be implemented as cam or protrusion and may, for example, have a diameter D2 in a range of about 2 mm to 3 mm, e.g. of about 2.4 mm. The first portion 104a may have a height H1 in a range of about 0.5 mm to 1.5 mm, e.g. of about 1 mm. The second portion 104b may have a height H2 in a range of about 0.3 mm to 0.8 mm, e.g. of about 0.5 mm.

The first portion 104a and the second portion 104b may be separate entities. The first portion 104a and the second portion 104b may be connected using glue, for example, Cyanoacrylate, for example, Loctite 401 or Loctite 406. The first portion 104a may have a height or thickness in a range of about 0.6 mm to 1.0 mm, e.g. of about 0.8 mm. The first portion 104a may have a height or thickness in a range of about 0.3 mm to 0.8 mm, e.g. of about 0.5 mm. In case that the first portion 104a has a height or thickness in a range of about 0.6 mm to 1.0 mm, e.g. of about 0.8 mm, or in case that the first portion 104a has a height or thickness in a range of about 0.3 mm to 0.8 mm, e.g. of about 0.5 mm, the second portion 104b or cam may have a diameter D2 in a range of about 2.2 to 2.6 mm, e.g. of 2.4 mm, and may have a height in a range of about 0.8 mm to 1.2 mm, e.g. of 1 mm.

The material used for portions 104a and 104b may be steel, for example, soft metal or soft steel, suitable for cold forming, for example, B1 EN 10131-1.00-DC01=1.0330 EN 10130. However, any other material having the same or equal mechanical characterization may be used instead.

Figure 4A:
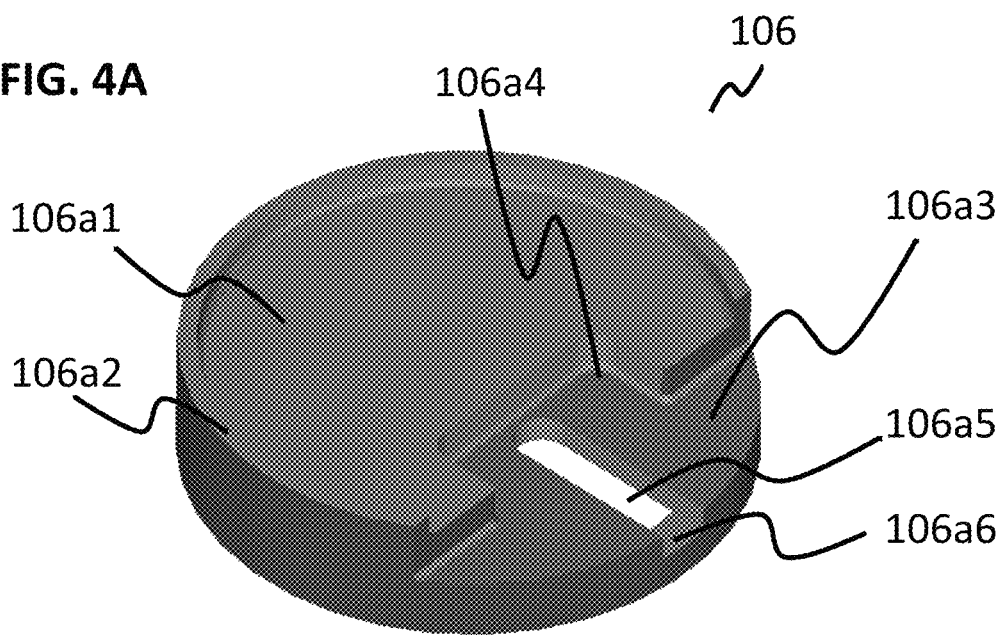
FIGS. 4A and 4B are three-dimensional schematic views showing a casing in accordance with various embodiments.
Figure 4B:
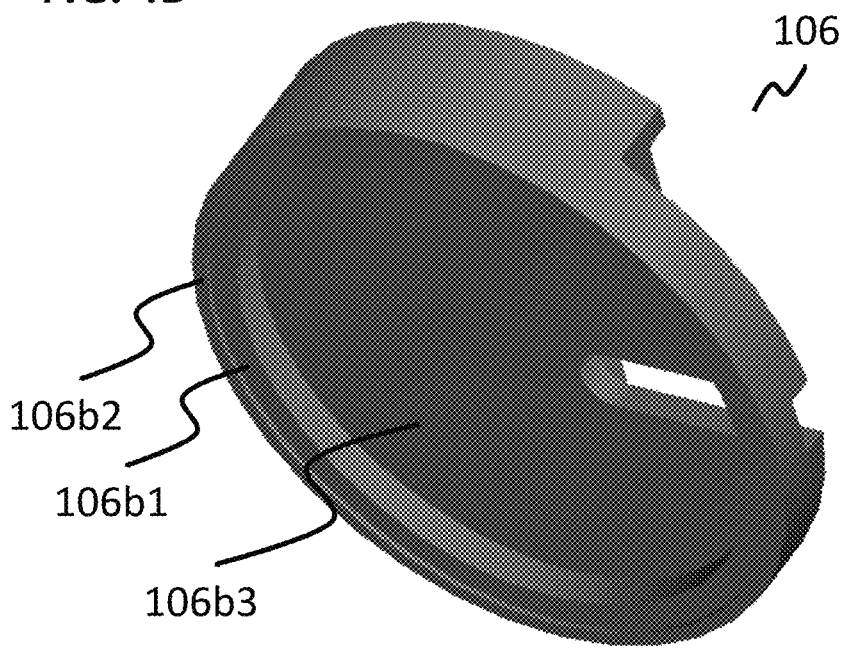

FIGS. 4A and 4B show a casing 106 in schematic three-dimensional views in accordance with various embodiments. The casing 106 may be used in the devices 100a and 100b, as described in view of FIGS. 1A-1D and 2A-2D.

FIGS. 5A to 5D show a casing 106 in a schematic view in accordance with various embodiments. FIG. 5A shows a bottom view of the casing 106. FIG. 5B shows a side view of the casing 106. FIG. 5C shows a sectional view of the casing 106. FIG. 5D shows a top view of the casing 106. The casing 106 may be used in the devices 100a and 100b, as described in view of FIGS. 1A-1D and 2A-2D.

The casing 106 may be manufactured of Polyamide 12 (PA 12). The casing 106 may have mechanical characteristics of yield stress ISO 527 of about 46 MPa dry and 36 MPa at humidity, tensile modulus of elasticity ISO 527 of about 1500 MPa dry and 1100 MPa at humidity. However, any other material having the same or equal mechanical characterization may be used instead. The casing 106 may have a diameter D3 in a range of about 40 mm to 44 mm, e.g. of about 42 mm. The casing 106 may have a diameter D4 in a range of about 38 mm to 42 mm, e.g. of about 40 mm. The casing 106 may have a diameter D5 in a range of about 34 mm to 38 mm, e.g. of about 36 mm. The casing 106 may have a diameter D6 in a range of about 37 mm to 41 mm, e.g. of about 39.19 mm. The casing 106 may have a thickness or height H3 in a range of about 8 mm to 12 mm, e.g. of about 9.9±0.1 mm. The casing 106 may have a thickness or height H4 in a range of about 3 mm to 7 mm, e.g. of about 5.1 mm. The casing 106 may have a thickness or height H5 in a range of about 1 mm to 3 mm, e.g. of about 2 mm. The casing 106 may have a thickness or height H6 in a range of about 2 mm to 3 mm, e.g. of about 2.4±0.05 mm. The casing 106 may have a thickness or height H7 in a range of about 0.2 mm to 1.2 mm, e.g. of about 0.6 mm. The casing 106 may have a thickness or height H8 in a range of about 1.5 mm to 2.5 mm, e.g. of about 2 mm. The casing 106 may have a thickness or height H9 in a range of about 4 mm to 6 mm, e.g. of about 5.1 mm. The casing 106 may have a length L1 in a range of about 3.5 mm to 4.5 mm, e.g. of about 4.0 mm. The casing 106 may have a length L2 in a range of about 5.5 mm to 8.5 mm, e.g. of about 7.1 mm. The casing 106 may have a length L3 in a range of about 10.5 mm to 11.5 mm, e.g. of about 11.0 mm. The casing 106 may have a length L4 in a range of about 3.5 mm to 5.5 mm, e.g. of about 4.3 mm. The casing 106 may have a length L5 in a range of about 17.5 mm to 18.5 mm, e.g. of about 18.0 mm. The casing 106 may have a length L6 in a range of about 34 mm to 36 mm, e.g. of about 35.14 mm. The casing 106 may have a radius R1 in a range of about 0.4 mm to 0.6 mm, e.g. of about 0.5 mm. The casing 106 may have a radius R2 in a range of about 0.4 mm to 0.6 mm, e.g. of about 0.5 mm. The casing 106 may have a radius R3 in a range of about 0.4 mm to 0.6 mm, e.g. of about 0.5 mm. The casing 106 may have a radius R4 in a range of about 0.1 mm to 0.3 mm, e.g. of about 0.2 mm or a radius of maximal 0.2 mm. The casing 106 may have a radius R5 in a range of about 0.4 mm to 0.6 mm, e.g. of about 0.5 mm. The casing 106 may have a radius R6 in a range of about 1.6 mm to 2.6 mm, e.g. of about 2.1 mm. The casing 106 may have a radius R7 in a range of about 1.6 mm to 2.6 mm, e.g. of about 2.1 mm. The casing 106 may have a radius R8 in a range of about 0.4 mm to 0.6 mm, e.g. of about 0.5 mm.

FIGS. 6A to 6D show a support panel 108 in a schematic view in accordance with various embodiments. FIG. 6A shows a top view of the support panel 108. FIGS. 6B and 6C show side views of the support panel 108. FIG. 6D shows a sectional view of the support panel 106. The support panel 108 may have a length L22 in a range of about 4.5 mm to 6.5 mm, e.g. of about 5.5 mm. The support panel 108 may have a length L8 in a range of about 39 mm to 41 mm, e.g. of about 40 mm. The support panel 108 may have a length L9 in a range of about 14 mm to 24 mm, e.g. of about 19 mm. The support panel 108 may have a length L10 in a range of about 12 mm to 22 mm, e.g. of about 17 mm. The support panel 108 may have a length L11 in a range of about 1.5 mm to 2.5 mm, e.g. of about 2 mm. The support panel 108 may have a length L12 in a range of about 6 mm to 7 mm, e.g. of about 6.5 mm. The support panel 108 may have a length L13 in a range of about 8 mm to 9 mm, e.g. of about 8.5 mm. The support panel 108 may have a length L14 in a range of about 9.5 mm to 11.5 mm, e.g. of about 10.5 mm. The support panel 108 may have a length L15 in a range of about 350 mm to 370 mm, e.g. of about 360 mm. The support panel 108 may have a length L16 in a range of about 346 mm to 366 mm, e.g. of about 356 mm. The support panel 108 may have a length L17 in a range of about 0.3 mm to 0.7 mm, e.g. of about 0.5 mm. The support panel 108 may have a length L18 in a range of about 46.5 mm to 56.5 mm, e.g. of about 51.5 mm. The support panel 108 may have a length L19 in a range of about 0.7 mm to 1.7 mm, e.g. of about 1.2 mm. The support panel 108 may have a length L20 in a range of about 200 mm to 232 mm, e.g. of about 216 mm. The support panel 108 may have a length L21 in a range of about 210 mm to 230 mm, e.g. of about 220 mm. The support panel 108 may have a length L7 in a range of about 1.5 mm to 2.5 mm, e.g. of about 2 mm. The support panel 108 may have a length L23 in a range of about 0.5 mm to 1.5 mm, e.g. of about 1 mm. The support panel 108 may have a length L24 in a range of about 0.5 mm to 1.5 mm, e.g. of about 1 mm. The support panel 108 may have a length L25 in a range of about 0.5 mm to 1.5 mm, e.g. of about 1 mm. The support panel 108 may have a radius R9, R10, and R12 in a range of about 0.5 mm to 1.5 mm, e.g. of about 1 mm. The support panel 108 may have a radius R11 in a range of about 2.5 mm to 3.5 mm, e.g. of about 3 mm. A material used for support panel 108 may be steel, for example, austenitic stainless steel, for example, B1 ISO 9445-1.00-X5CrNi 18-10=1.4301 EN 10088-2, for example brushed corned 120. However, any other material having the same or equal mechanical characterization may be used instead.

A U-turned portion 112 of the support portion 108 is provided, e.g. by bending a portion of the support portion 108, as schematically illustrated in FIGS. 6A, 6B, and 6D. The U-turned portion 112 may be bent such, that an end portion of the U-turned portion 112 is aligned parallel to a main portion of the support portion 108, on which objects may be put. A pocket for cable routing may be provided, which may have a radius R11 and length L8, as schematically illustrated in FIGS. 6B and 6D.

FIGS. 7A to 7E show a weighing device 110 in schematic views in accordance with various embodiments. FIG. 7A shows a bottom view of the weighing device 110 in accordance with various embodiments. FIGS. 7B and 7C show side views of the weighing device 110 in accordance with various embodiments. FIGS. 7D and 7E show sectional views of the weighing device 110 in accordance with various embodiments.

In various embodiments, the weighing device 110 may include at least one, e.g. four devices 100 for measuring forces, e.g. two devices 100a for measuring forces and two devices 100b for measuring forces. The material used for the first and second portions of the force input device may be steel, for example, soft metal or soft steel, suitable for cold forming, for example, B1 EN 10131-1.00-DC01=1.0330 EN 10130, and the material of the casing may be Polyamide (PA) 12, the material of the support panel may be steel, for example, soft metal or soft steel, suitable for cold forming, for example, B1 EN 10131-1.00-DC01=1.0330 EN 10130, and, the sensor includes at least a coil and a printed circuit board, and the casing 106, the sensor 102, and the force input device 104 are coupled using glue, for example, Cyanoacrylate (CA), for example, Loctite 401 or Loctite 406, as shown in FIG. 7D (Pos1) and 7E (Pos2).

The devices 100a and 100b are positioned in an edge portion of the support plate 108, respectively, and such, that a device 100a is adjacent to a device 100b, respectively, as e.g. schematically illustrated in FIG. 7A. As schematically illustrated in FIGS. 7A and 7D, devices 100a are arranged such that a portion of a sensor 102 in a casing 106 of the device 100a is next or adjacent to a U-turned portion 112 of the support panel 108, as schematically illustrated in FIGS. 7A and 7D. At least on sensor 102 is configured to measure a distance to a surface of at least one U-turned portion of the support panel 108. A height L26 and L27 may depend on the material of the casing 106. In case, the casing 106 is made from plastic, a height 126 and 127 may be in a range of 0.4 mm to 0.8 mm, e.g. about 0.6 mm. In case, the casing 106 is made from aluminum, a height L26 and L27 may be in a range of about 0.8 mm to 1.2 mm, e.g. about 1.0 mm. A distance between the U-turned portion of the support panel 108 and the sensor 102 in device 100a may have a length L26 in a range of about 0.5 mm to 1.5 mm, e.g. about 1 mm, as illustratively shown in FIG. 7D. A distance between the support panel 108 and the sensor 100b may have a length L27 in a range of about 0.6 mm to 1 mm, e.g. about 0.8 mm, as illustratively shown in FIG. 7D. A distance between an upper surface of the support panel 108 and a bottom surface of the force input panel 104 may have a length L28 in a range of about 10 mm to 14 mm, e.g. about 12 mm, as schematically shown in FIG. 7E.

In various embodiments, at least two sensors 102 of devices 100a are configured such that the sensors 102 of the devices 100a may be close to the U-turned portion 112 of the support panel 108 and may be configured to measure with high resolution when a small amount of load is applied to the support panel 108. At least two sensors 102 of devices 100b may be configured such that the sensors 102 of the devices 100a may be farer away from the sensors 102 and are configured to measure with high resolution when a huge amount of load is applied to the support panel 108, as illustratively shown in FIGS. 7D and 7E.

In various embodiments, at least two sensors 102 of devices 100b are configured such that the sensors 102 of the devices 100b are close to the sensors 102 and are configured to measure with high resolution when a small amount of load is applied to the support panel 108. At least two sensors 102 of devices 100a are configured such that the sensors 102 of the devices 100a are farther away from the U-turned portion 112 of the support panel 108 and are configured to measure with high resolution when a huge amount of load is applied to the support panel 108.

A weighing device 110 having a high resolution under small load influence and under high load influence may be achieved because the respective sensors 100 may be operated in its effective range.

The features mentioned above in conjunction with exemplary or specific examples may also be applied to further exemplary examples mentioned above and vice versa. Further, advantages mentioned in relation to the device for measuring forces also refer to the weighing device and vice versa.

In the following, various examples are provided with reference to the figures and examples described above.

Example 1 is a device for measuring forces, including: at least one sensor, at least one force input device configured to elastically deform in relation to an external force acting on the device, and a casing coupled to the sensor and the force input device, wherein the sensor is configured such that, when the force is applied to the device, the sensor detects the force in relation to the elastic deformation of the force input device, and wherein the casing is configured to accommodate the sensor in the casing in at least two different positions.

In Example 2, the device of Example 1 may optionally include that the sensor is an inductive sensor, and/or wherein the force input device is made from an electric conductive material.

In Example 3, the device of Example 1 or 2 may optionally include that the sensor includes at least one of a coil, a magnetic core, an oscillator, a demodulator, a flip-flop, a comparator, an output stage, and a printed circuit board.

In Example 4, the device of Example 1 to 3 may optionally include that the sensor is enclosed by the casing or wherein the sensor is partially enclosed by the casing.

In Example 5, the device of Example 1 to 4 may optionally include that the sensor further includes an integrated Radio Frequency Identification (RFID) communication device, configured such, that depending on the acting force the sensor communicates data to an external device using the integrated RFID communication device.

In Example 6, the device of Example 1 to 5 may optionally include that the force input device includes a circular disk shape, wherein the force input device is of an elastic material, and wherein at least one protrusion is provided at a center position of the force input device, and wherein the protrusion is orientated away from the casing.

In Example 7, the device of Example 1 to 6 may optionally include that the force input device and/or the sensor are/is coupled to the casing using glue.

In Example 8, the device of Example 1 to 7 may optionally include that the force input device and the casing are arranged concentrically.

In Example 8, the device of Example 1 to 7 may optionally include that the casing includes a circular cylindrical shape of a predetermined height, wherein a first side of the casing includes a recess of a predetermined depth, wherein a second side of the casing includes a first recess of a predetermined depth and a second recess of a predetermined depth, wherein the casing includes a step of a predetermined height, and a recess of a predetermined length, and wherein the casing further includes an elongated hole of a predetermined depth.

In Example 10, the device of Example 1 to 9 may optionally include that the casing is made of Polyamide 12, and/or wherein the force input device is made of steel.

Example 11 is a weighing device for weighing of objects, including: a plurality of devices according to any one of claims 1 to 10, and at least one support panel, wherein each device is arranged at an edge corner portion of a first surface of the support panel, respectively, and wherein the devices are coupled to the first surface of the support panel such, that at least one device is coupled to the support panel using a first side of the device, and that at least one further device is coupled to the support panel using a second side of the further device, wherein the second side is an opposite side of the first side.

In Example 12, the weighing device of Example 11 may optionally include that adjacent devices of the plurality of devices are coupled to the support panel using alternating the first side of the device and the second side of the device.

In Example 13, the weighing device of Example 11 or 12 may optionally include that the support panel includes a plate shape of a predetermined height and is made of an electric conductive material, wherein at least one edge portion of the support panel includes an U-turned portion, wherein the U-turned portion is configured to partially overlap at least one device of the plurality of devices, wherein the U-turned portion of the support panel and the at least one sensor are configured such that, when a force is applied to the force input device using the support plate, the at least one sensor measures a change in an electromagnetic field generated by the sensor due to movement of the respective U-turned portion, and wherein the sensor is partially enclosed by the casing.

In Example 14, the weighing device of Example 11 to 13 may optionally include that a portion of the support panel is configured to accommodate an electronic device, wherein the electronic device is configured to communicate with at least one sensor of the at least one device, and is further configured to communicate data to an external device using RFID transmission.

In Example 15, the weighing device of Example 11 to 14 may optionally include that at least one device is coupled to the support panel using glue.

Example 16 is a method for producing a casing, including: producing a circular cylindrical shape having a predetermined height, removing a first portion of a top portion of the circular cylindrical shape by a predetermined depth, removing a second portion of a bottom portion of the circular cylindrical shape by a predetermined depth, removing a portion of the circular cylindrical shape such, that material in a predetermined height is removed, wherein removal is performed in line with a shape parallel to the base area of the circular cylindrical shape to a predetermined shape aligned orthogonal to the base area, further removing a second portion of the circular cylindrical shape such, that material in a predetermined height is removed, wherein removal is performed in line with a shape parallel to the base area of the circular cylindrical shape to a predetermined shape aligned orthogonal to the base area, drilling a hole in the portion where material was removed, and performing a slot hole from the position of the drilled hole from an interior portion of the circular cylindrical shape to an edge region of the circular cylindrical shape, such that a wall thickness of a predetermined thickness remains.

While various embodiments have been particularly shown and described with reference to specific examples, it should be understood by those skilled in the art that various changes in form and detail may be made therein without departing from the spirit and scope of the invention as defined by the claims. The scope is indicated by the claims and all changes which come within the meaning and range of equivalency of the claims are therefore intended to be embraced.

What is claimed is:

1. A device for measuring forces, comprising:
   at least one sensor;
   at least one force input device configured to elastically deform in relation to an external force acting on the device; and
   a casing coupled to the sensor and the force input device,
       wherein the sensor is configured such that, when the force is applied to the device, the sensor detects the force in relation to the elastic deformation of the force input device, and
       wherein the casing is configured to accommodate the sensor in the casing in at least two different positions
   wherein the casing comprises a circular cylindrical shape of a predetermined height
   wherein a first side of the casing comprises a recess of a predetermined depth,
   wherein a second side of the casing comprises a first recess of a predetermined depth and a second recess of a predetermined depth;
   wherein the casing comprises a step of a predetermined height, and a recess of a predetermined length, and
   wherein the casing further comprises an elongated hole of a predetermined depth.

2. The device of claim 1,
   wherein the sensor is an inductive sensor and/or wherein the force input device is made from an electric conductive material.

3. The device of claim 1,
   wherein the sensor includes at least one of a coil, a magnetic core, an oscillator, a demodulator, a flip-flop, a comparator, an output stage, and a printed circuit board.

4. The device of claim 1,
   wherein the sensor is enclosed by the casing or wherein the sensor is partially enclosed by the casing.

5. The device of claim 1,
   wherein the sensor further comprises an integrated RFID communication device, configured such, that depending on the acting force the sensor communicates data to an external device using the integrated RFID communication device.

6. The device of claim 1,
   wherein the force input device comprises a circular disk shape,
   wherein the force input device is of an elastic material, and
   wherein at least one protrusion is provided at a center position of the force input device, and
   wherein the protrusion is orientated away from the casing.

7. The device of claim 1,
   wherein the force input device and/or the sensor are/is coupled to the casing using glue.

8. The device of claim 1,
   wherein the force input device (104) and the casing (106) are arranged concentrically.

9. The device claim 1,
   wherein the casing is made of Polyamide 12, and/or wherein the force input device is made of steel.

10. A weighing device for weighing of objects, comprising:
    a plurality of devices each including:
       at least one sensor;
       at least one force input device configured to elastically deform in relation to an external force acting on the device; and
       a casing coupled to the sensor and the force input device,
           wherein the sensor is configured such that, when the force is applied to the device, the sensor detects the force in relation to the elastic deformation of the force input device, and
           wherein the casing is configured to accommodate the sensor in the casing in at least two different positions; and
    at least one support panel,
       wherein each device is arranged at an edge corner portion of a first surface of the support panel, respectively; and
       wherein the devices are coupled to the first surface of the support panel such, that at least one device is coupled to the support panel using a first side of the device, and that at least one further device is coupled to the support panel using a second side of the further device, wherein the second side is an opposite side of the first side
    wherein the support panel comprises a plate shape of a predetermined height and is made of an electric conductive material;
    wherein at least one edge portion of the support panel comprises an U-turned portion;
    wherein the U-turned portion is configured to partially overlap at least one device of the plurality of devices;
    wherein the U-turned portion of the support panel and the at least one sensor are configured such that, when a force is applied to the force input device using the support plate, the at least one sensor measures a change in an electromagnetic field generated by the sensor due to movement of the respective U-turned portion, and
    wherein the sensor is partially enclosed by the casing.

11. The weighing device of claim 10,
    wherein adjacent devices of the plurality of devices are coupled to the support panel using alternating the first side of the device and the second side of the device.

12. The weighing device of claim 10,
    wherein a portion of the support panel is configured to accommodate an electronic device, and
    wherein the electronic device is configured to communicate with at least one sensor of the at least one device, and is further configured to communicate data to an external device using Radio-Frequency-Identification (RFID) transmission.

13. The weighing device of claim 10,
    wherein at least one device is coupled to the support panel using glue.

* * * * *